United States Patent [19]

Lipshield

[11] 4,292,858
[45] Oct. 6, 1981

[54] BRAKE CABLE OPERATING MEANS OF THE OVERCENTER TOGGLE TYPE

[75] Inventor: Eugene C. Lipshield, Moberly, Mo.

[73] Assignee: Orscheln Brake Lever Mfg. Co., Moberly, Mo.

[21] Appl. No.: 937,539

[22] Filed: Aug. 28, 1978

Related U.S. Application Data

[62] Division of Ser. No. 806,963, Jun. 16, 1977, Pat. No. 4,127,042.

[51] Int. Cl.³ .......................... F16C 1/10; G05G 1/04
[52] U.S. Cl. .................................... 74/501 R; 74/518
[58] Field of Search .................. 74/501 R, 502, 523, 74/524, 491, 516, 518

[56] References Cited

U.S. PATENT DOCUMENTS

| | | | |
|---|---|---|---|
| 2,464,096 | 3/1949 | Orscheln | 74/491 |
| 2,865,220 | 12/1958 | Bayley | 74/501 |
| 4,075,907 | 2/1978 | Petrzelka | 74/523 |

*Primary Examiner*—Kenneth Dorner
*Attorney, Agent, or Firm*—Laubscher & Laubscher

[57] ABSTRACT

An improved brake lever assembly of the overcenter toggle type is disclosed, wherein the brake operating lever is preferably pivotally connected with the stationary mounting plate assembly about a pivot axis that is laterally displaced from the linear axis of travel of an inner cable member relative to the concentrically arranged tubular outer sheath, thereby to reduce wear of the inner cable guide means. According to a first feature of the invention, an improved anchor plate or anchor plate arrangement is provided for connecting one end of the outer sheath member with one end of the stationary mounting plate assembly. In accordance with a second feature, a ratchet and pawl assembly is provided for releasably locking the operating lever in various angular positions relative to the mounting plate assembly. In order to effect reserve travel of the operating lever beyond the normal brake fully applied position, the bow-shaped connecting link may include a plurality of pivotally connected sections that are foldable about the pivot axis of the operating lever, thereby to permit additional tensioning of the inner brake cable under emergency hand braking conditions.

3 Claims, 14 Drawing Figures

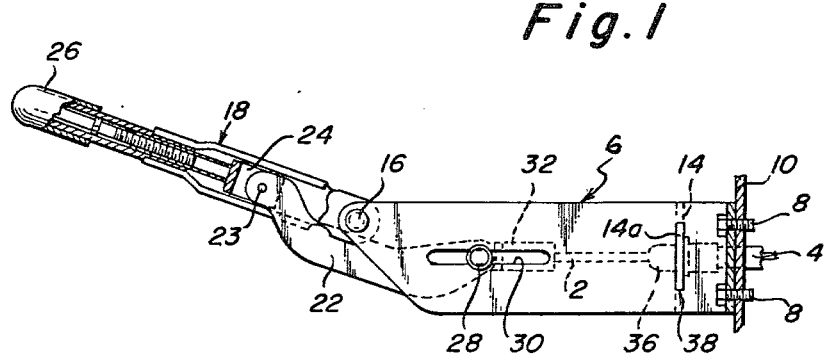
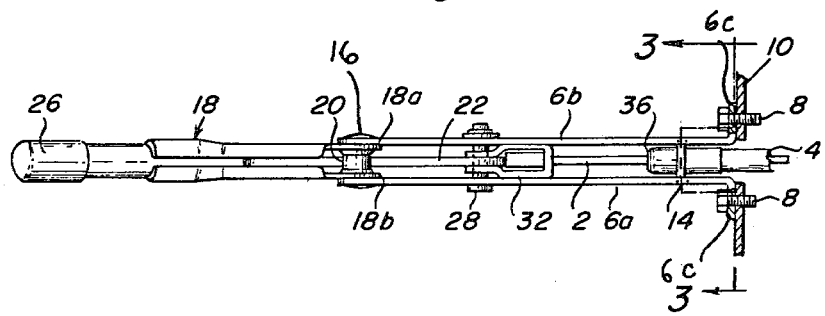
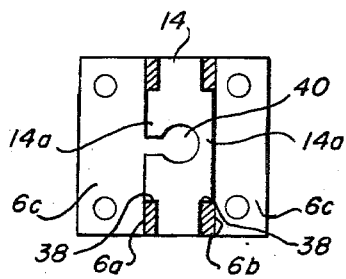
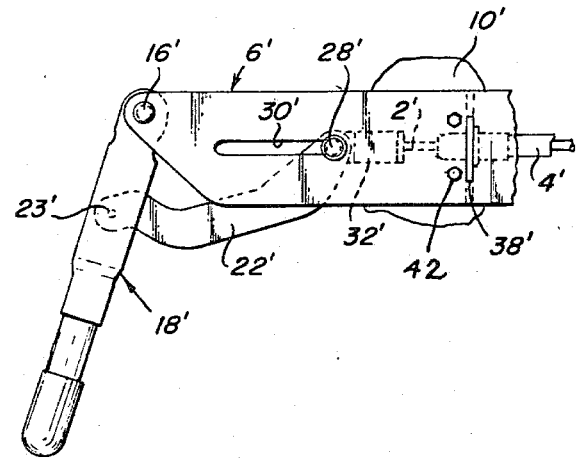

BRAKE CABLE OPERATING MEANS OF THE OVERCENTER TOGGLE TYPE

This is a division of application Ser. No. 806,963, filed June 16, 1977 (now U.S. Pat. No. 4,127,042.)

BRIEF DESCRIPTION OF THE PRIOR ART

In the prior U.S. patents to Orscheln U.S. Pat. No. 2,464,096 and Hirst U.S. Pat. No. 3,379,074—each assigned to the same assignee as the present invention—brake cable operating means of the overcenter toggle type are disclosed for operating a brake cable between locked and released conditions. In these patents, a generally bow-shaped connecting link is provided that is pivotally connected at one end with the operating lever, and at the other end with the free end of the cable which in turn is guided for linear axial movement relative to the mounting plate assembly, whereby in the brake fully applied position of the operating lever, the pivotal connection between the lever and the link is displaced to a position overcenter from the pivot axis of the lever and the pivotal connection between the link and the mounting plate assembly. Tension adjustment means are normally provided which include means for displacing axially of the operating lever the pivotal connection between the lever and the connecting link, thereby to control the extent of displacement of the free end of the inner cable member relative to its stationary outer sheath, whereby the braking tension of the inner cable member may be controlled. The free end of the inner cable is connected with a transverse guide pin the ends of which extend through opposed linear guide slots contained in the spaced mounting plates. In the Orscheln U.S. Pat. No. 2,464,097, the connecting link is pivotally connected with a bell crank the pivotal displacement of which defines the output travel.

The above mentioned control mechanisms are of the overcenter toggle type and are adjustable by the vehicle operator to compensate for normal brake wear, a feature not available on most ratchet and pawl type mechanisms which rely on engagement of the pawl with the next ratchet sector tooth as the only means of adjustment available to the vehicle operator. However, even this means is often not adequate due to the unsufficient mechanical advantage common to a relatively constant ratio ratchet and pawl type mechanism.

With the overcenter toggle type mechanism as previously mentioned, fine adjustment is available to produce the precise results desired. During the initial movement of the handle, a relatively large amount of travel with a low mechanical advantage is afforded with the output travel constantly decreasing and the mechanical advantage ratio constantly increasing as the handle moves to its overcenter locked position.

Although the overcenter toggle type control mechanism has performed well for many years, it is limited to being in either the released position (off) or in the overcenter locked position (on). In spite of the fine adjustment and high mechanical advantage, it is desired to provide a control mechanism that includes not only the advantages of the overcenter toggle means, but also the luxuries of the intermediate stops of a ratchet and pawl type control mechanism.

It is further desired to provide a control mechanism which includes the overcenter toggle means with a reserve of travel beyond the normal overcenter stop for use, for example, in emergency or panic situations where extra holdability is needed, but there is not time to make the necessary adjustment.

It is also desired to provide a control mechanism which includes the overcenter toggle means, the intermediate tooth stops of a ratchet and pawl means before the normal overcenter stop and reserve travel with tooth stops beyond the normal overcenter stop.

Referring to another aspect of the present invention, in the brake operating means of the Orscheln U.S. Pat. No. 2,464,096, the pivot axis of the operating lever is spaced from the end of the slots but on the same centerline, and although this combination has performed quite well in the past, it is subject to excessive wear on one side of the slots due to repeated cycling under relatively high loads, whereby the efficiency of the brake operating means is significantly reduced. This invention also requires additional parts in order to anchor a co-axial brake linkage to the mounting plate assembly.

The present invention was developed to avoid the above and other drawbacks of the known brake cable operating means.

SUMMARY OF THE INVENTION

Accordingly, the primary object of the present invention is to provide improved brake cable operating means of the overcenter toggle type including ratchet and pawl means for releasably locking the operating lever in desired angular positions relative to the mounting plate means.

In accordance with a more specific object of the invention, the bow-shaped connecting link which connects the free end of the inner cable member with the operating lever comprises a plurality of pivotally connected sections, thereby to afford reserve travel of the operating lever beyond the brake fully applied position upon emergency or panic hand braking conditions. This reserve travel of the operating lever is achieved with a reduced mechanical advantage ratio, whereby increased input force is required to utilize the reserve travel, thus making the use of such reserve travel a deliberate operation. The reduced mechanical advantage ratio is essential to avoid damaging the various components affected by the control mechanism. The availability of this reserve travel is provided primarily for use during emergency situations wherein the control system that is adjusted for normal use may not provide adequate results for such a situation.

Yet another object of the present invention is to provide a control mechanism of the overcenter toggle type including pawl and ratchet means affording intermediate stops between the released position and the normal overcenter locked position as well as beyond the normal overcenter locked position.

In accordance with another object of the present invention, the pivot axis of the operating lever is laterally offset from the guided linear axis of travel of the free end of the inner cable member relative to the mounting plate means and the outer sheath, thereby to achieve a more efficient brake operating means that is subject to less wear, and consequently has a longer life and less overcenter drop off.

According to a further object of the invention, improved simplified anchor means are provided which not only rigidly connect one end of the outer sheath of the cable assembly with the mounting plate means, but also serve to space the ends of the spacer plates at one end of the mounting means. In one embodiment, the anchor means comprises a transverse anchor plate which contains an opening in which the end of the outer sheath is mounted. The ends of the anchor plate contain projections that extend through corresponding openings in the mounting plates, thereby to stabilize and space the mounting plates. In a second embodiment, the anchor means comprise integral tab portions bent inwardly from, and extending at right angles to, the mounting plates, respectively, each tab having at its free end a projection that extends within a corresponding opening contained in the other plate. Consequently, since the use of at least one set of spacer means is eliminated, a fewer number of parts for the mounting plate assembly is required, and the mounting plate assembly may be more easily and quickly assembled.

BRIEF DESCRIPTION OF THE FIGURES

FIGS. 1 and 2 are side elevation and top plan views, respectively, of a first embodiment of the invention wherein the pivot axis of the operating lever is laterally offset from the guide axis of the inner cable member, and further including anchor means of the anchor plate type;

FIG. 3 is a sectional view taken along lines 3—3 of FIG. 2;

FIG. 4 illustrates the apparatus of FIG. 1 when the operating lever is in the brake released position;

DETAILED DESCRIPTION

Figures 5, 6:
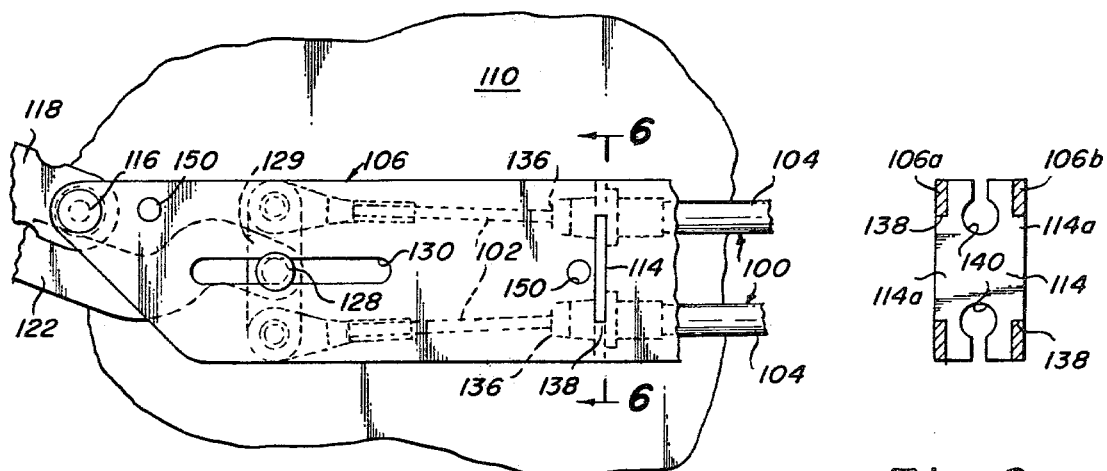
FIG. 5 illustrates a modification of the apparatus of FIGS. 1–4 wherein the apparatus is designed to operate a pair of brake cable assemblies.
FIG. 6 is a sectional view taken along line 6—6 of FIG. 5.

Referring now to FIGS. 1–3, the brake cable operating means for axially displacing the inner brake cable member 2 relative to the tubular outer sleeve member 4 includes mounting plate means 6 that is adapted to be bolted by bolts 8 to a fixed support 10, such as the firewall of a motor vehicle. The mounting plate means includes a pair of parallel spaced mounting plates 6a and 6b that are provided at one end with outturned flange portions 6c that are bolted to the fixed support 10. The ends of the mounting plates 6a and 6b are spaced by an anchor plate 14 as will be described in greater detail below. At their other ends, the mounting plates 6a and 6b are spaced by the rivet 16, the bifurcated arm portions 18a and 18b of the operating lever 18, and bushing spacer means 20. A bow-shaped connecting link 22 is pivotally connected at one end with a bifurcated U-shaped yoke member 24 that is axially displaceable relative to the operating handle 18 by screw thread operable tension adjusting knob 26, as is known in the art. At its other end, the connecting link 22 is pivotally connected with the central portion of a guide pin 28 the ends of which extend through linear guide slots 30 contained in the mounting plates 6a and 6b, respectively. Also mounted on the central portion of the guide pin 28 is a generally U-shaped yoke member 32 to which is connected the free end of the inner brake cable member 2. The adjacent end of the outer sheath member 4 is connected with the anchor plate 14 by means of a suitable ferrule 36. Examples of such anchoring ferrules are illustrated in the patents to Severence U.S. Pat. No. 3,366,405, Bratz U.S. Pat. No. 2,869,905, Brickman U.S. Pat. No. 2,954,248 and Benham U.S. Pat. No. 3,101,205, for example.

As shown in FIG. 3, the anchor plate 14 that extends transversely across the space between the mounting plates 6a and 6b includes at each end projections 14a that extend through corresponding opposed slots 38 contained in the mounting plates 6a and 6b, respectively. The anchor plate 14 contains a centrally arranged slot 40 for receiving the end of the cable sheath 4 which is connected with the anchor plate 14 by the anchoring ferrule 36. Thus, the anchor plate 14 serves both to stabilize and to maintain in spaced relation the mounting plates 6a and 6b of the mounting assembly 6.

Operation

In operation, as the operating lever 18 is pivoted in the clockwise direction from the brake released position toward the brake fully applied position of FIG. 1, the guide pin 28 is laterally displaced relative to the guide slots 30 to displace the free end of the inner cable member 2 away from the end of the outer sheath member 4 that is secured to the anchor plate 14 by the ferrule 36. Consequently, the pivot pin 23 between the connecting link 22 and the operating lever 18 is displaced overcenter from the plane containing the pivot axes 16 and 28, whereby the drop off in travel due to the handle movement past dead center is less than it would have been if the pivot axis 16 were in line with the direction of linear travel of the free end of the inner cable member 2 as defined by the slots 30, thereby providing additional positive travel.

Instead of securing the mounting plate means in an endwise connected fashion to the fixed support 10 as shown in FIGS. 1–3, the mounting plate means 6' could be bolted laterally to a fixed support 10' by means of bolts 42 that extend through aligned apertures in the mounting plates 6a' and 6b' as shown in FIG. 4.

Referring now to the modification of FIG. 5, a double brake system is disclosed including a pair of brake cable assemblies 100 each having an inner cable member 102 and an outer sheath 104. In this embodiment, the free ends of the inner cable members 102 are connected with the opposite arms of an equalizer link 129 the center of which has a through bore receiving the guide pin 128. The adjacent free ends of the outer sheath members 104 are connected by ferrules 136 with a pair of slots 140 contained in the anchor plate 114. The anchor plate, which extends transversely between the spaced mounting plates 106a and 106b, is provided at opposite ends with projections 114a that extend within corresponding opposed recesses 138 contained in the parallel spaced mounting plates 106a and 106b. The mounting plates contain further aligned openings 150 for bolting the mounting plate assembly 106 in a side-mounted relation to a fixed support 110.

It is apparent that as the operating lever 118 is pivoted about the offset pivot axis 116 toward the brake fully applied position, the guide pin 128 is displaced to the left in the guide slots 130 to shift equalizer link 129 to the left and thereby displace the free ends of the inner cable members 102 from the adjacent ends of the outer sheath members 104, thereby to tension the inner cable members 102.

Figures 7, 8:
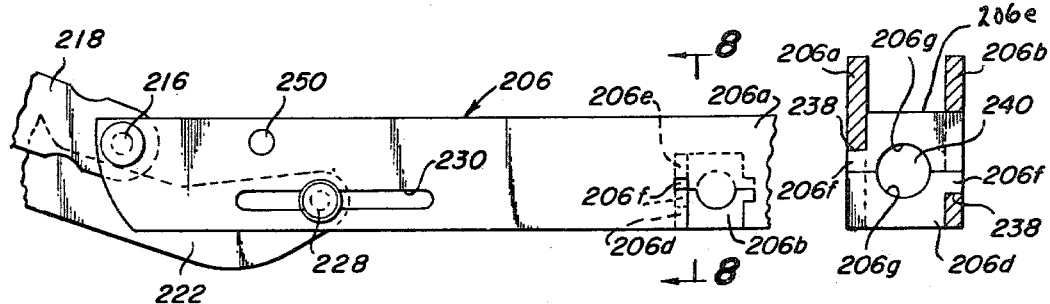
FIG. 7 is a detailed side elevational view of a second embodiment of the invention wherein the anchor means for the outer sheath are of the integral bent tab type.
FIG. 8 is a sectional view taken along line 8—8 of FIG. 7.

Referring now to the embodiment of FIGS. 7 and 8, the anchor plate means of FIGS. 1-6 are replaced by integral inwardly bent tab portions 206d and 206e that are formed from the parallel spaced mounting plates 206a and 206b, respectively. Each inwardly bent tab portion is provided at its free edge with a projection 206f that extends within a corresponding opening 238 contained in the mounting plates. The coplanar tab portions 206d and 206e contain at their adjacent edge portions opposed recesses 206g that cooperate to define a central opening 240 in which the free end of the outer sheath member is mounted by ferrule means, not shown. The mounting plates 206a and 206b contain aligned bolt openings 250 by means of which the mounting plate assembly 206 may be secured in a side-mounted manner to a fixed support.

Figure 9:
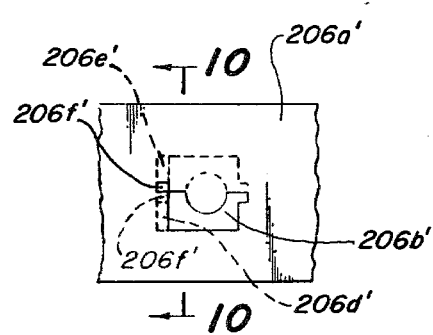
FIGS. 9 and 10 are detailed side elevation and sectional views, respectively, illustrating a modification of the integral bent tab anchor means of FIG. 7.
Figure 10:
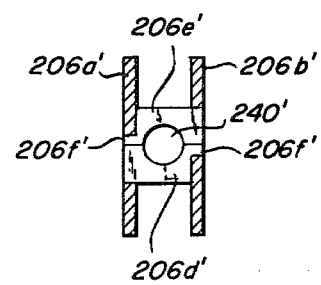

In the modification of FIGS. 9 and 10, the integral inwardly bent anchor tab portions 206d' and 206e' are formed in the central portions of the mounting plates 206a' and 206b'.

Figure 11:
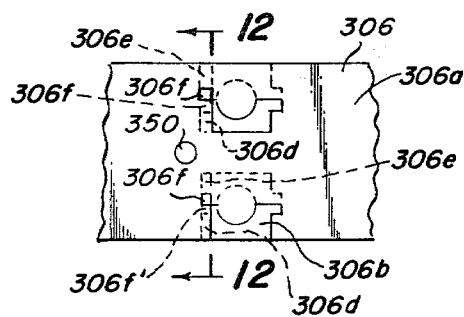
FIGS. 11 and 12 are detailed side elevation and sectional views, respectively, of a modification of the integral bent tab anchor means suitable for use with a double brake cable arrangement.
Figure 12:
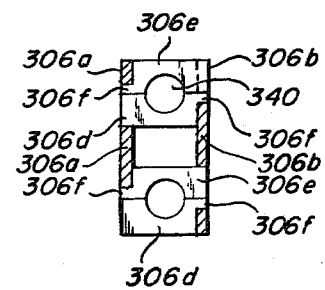
Figure 13:
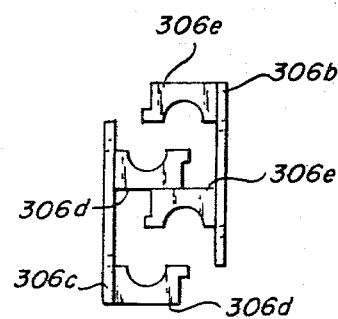
FIGS. 13 and 14 illustrate the manner of assembling the anchor means of the mounting plate assemblies of FIGS. 12 and 4, respectively.
Figure 14:
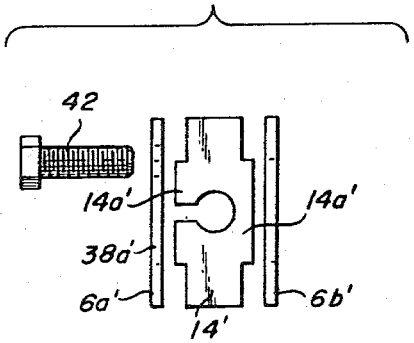

Referring now to the double brake cable assembly embodiment of FIGS. 11 and 12, the mounting plates 306a and 306b are provided with a pair of integral inwardly bent tab portions 306d and 306e, respectively, which tab portions are coplanar and contain recesses that cooperate to define the pair of openings 340 in which the ends of the outer sheath members are secured by conventional ferrule means. The manner of assembling the mounting plates 306a and 306b to define the anchor openings 340 is illustrated in FIG. 13, and the manner of assembling the mounting plates of FIG. 4 is illustrated in FIG. 14.

Referring again to FIG. 1, it will be noted that as the operating lever 18 is pivoted past dead center toward its overcenter brake fully applied position, the connecting link 22 abuts the spacer bushing 20 to limit the amount of drop off owing to the past dead center movement of the operating lever 18. Owing to the offset arrangement of the operating lever pivot axis 16, there is less overcenter drop off than in the brake cable operating means of the prior art.

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:

1. In a brake cable operating device for operating a coaxial brake cable assembly having a tubular outer sheath member, and an inner cable member axially displaceable within said outer sheath member, said operating device including mounting plate means adapted for connection with a fixed support, said mounting plate means including a pair of spaced parallel mounting plates; anchor means rigidly connecting one end of the outer sheath member between said plates at one end of said mounting plate means, thereby to prevent axial displacement of said outer sheath member relative to said mounting plate means, said inner cable member extending axially beyond said outer sheath member and through said anchor means into the space between said plates; guide means connecting one end of the inner cable member with said mounting plate means for linear axial displacement relative to said outer sheath member; and an operating lever pivotally connected at one end about a pivot axis with the other end of said mounting plate means, the pivot axis of said operating lever being normal to said plates; and a connecting link pivotally connected at opposite ends about pivot axes with an intermediate portion of said lever and with the one end of said inner cable member, respectively, the pivot axes of said connecting link being parallel with the pivot axis of said operating lever; the improvement wherein said anchor means comprises a first pair of coplanar tab portions bent inwardly from, and extending normal to, said mounting plates, respectively, each of said tab portions extending from the associated mounting plate transversely across the space between said mounting plates and including at its free end a projection that extends within a corresponding opening contained in the other mounting plate, thereby to maintain said mounting plates in spaced relation, said tab portions having adjacent parallel edges containing aligned recesses that define an opening (240) in which the end of the associated outer cable sheath is mounted.

2. Apparatus as defined in claim 1, and further including a second pair of coplanar tab portions bent inwardly from, and extending normal to, said mounting plates, respectively, said second pair of tab portions being coplanar with said first pair of tab portions and including parallel adjacent edges that contain aligned recesses that define a second opening for receiving the outer cable sheath member of a second brake cable assembly.

3. Apparatus as defined in clam 2, wherein said second pair of tab portions include at their free ends projections that extend within corresponding openings contained in said mounting plates.

* * * * *